United States Patent Office 2,736,984
Patented Mar. 6, 1956

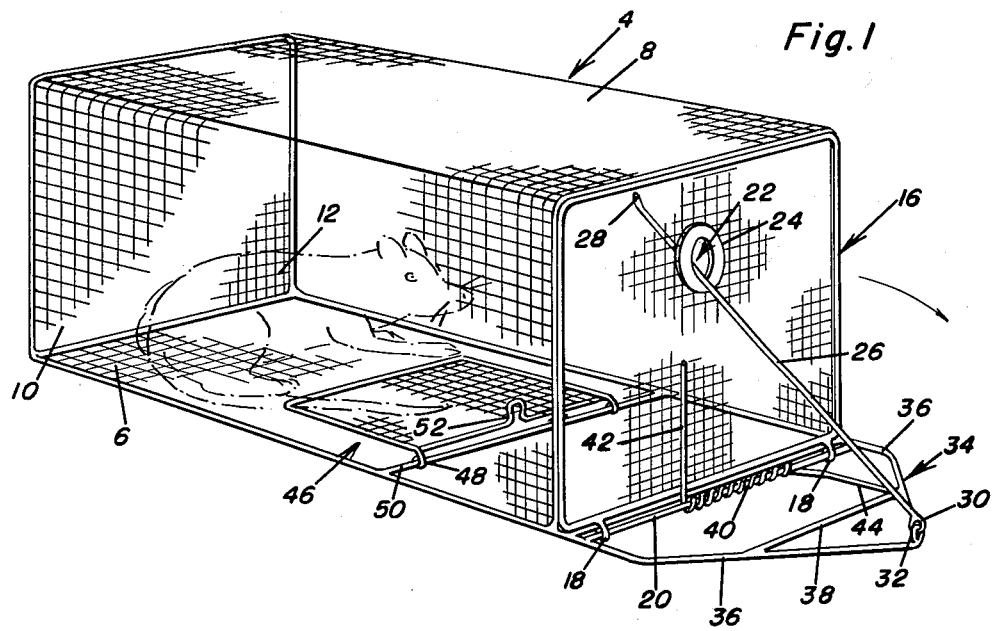
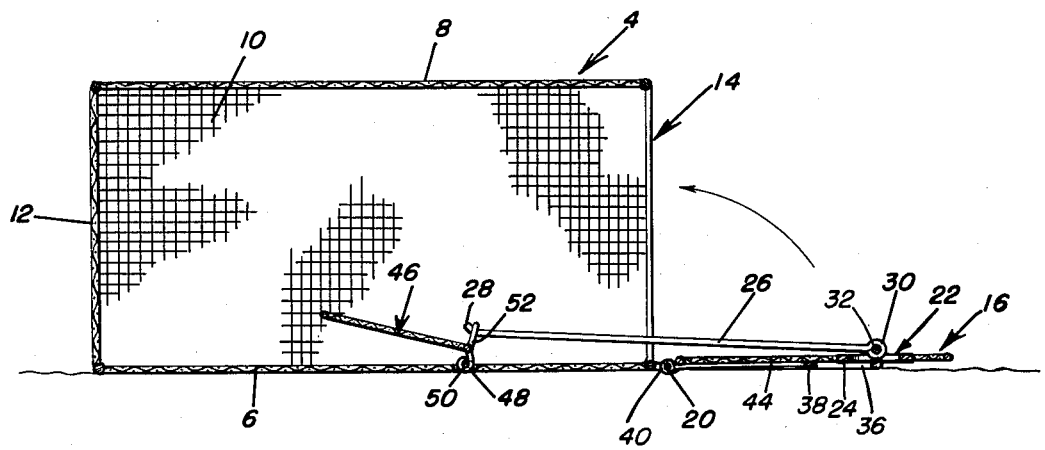
Roger E. Deane
INVENTOR.

2,736,984

ANIMAL TRAP

Roger E. Deane, Phoenix, Ariz.

Application October 12, 1953, Serial No. 385,355

4 Claims. (Cl. 43—61)

The present invention relates to animal traps, generally speaking, and has more particular reference to one which is characterized by a cage which is open at one end and provided at the latter end with a spring-closed trap door, and animal actuated means in said cage which functions to bring the trap door into play when the latter means is tripped by the animal in the cage.

It is a general object of the invention to provide a trap which falls in the category above briefly described wherein the victim is surely and safely trapped alive and, for the most part, rarely injured by way of the operating parts of the over-all trap.

A further objective is to provide a trap which is characterized by a cage having a spring actuated trap door, an animal actuated platform or pan pivotally mounted within the confines of the cage and an operating connection between the pan and trap door which holds the trap door in a down or open position and in readiness to spring the trap, whereby to thus provide a construction which may be used to advantage, depending on its size, for safely trapping birds of all kinds, small and large animals of innumerable kinds.

Briefly, a preferred embodiment of the invention has to do with a cage into which the victim is enticed by way of a bait within the trapping limits of the cage, the latter having an entrance at one end and a pivoted spring-closed trap door closing said entrance, an animal actuated pan pivotally mounted in said cage and having a keeper and eye, and a trip rod hingedly mounted at one end and having its opposite end free and fashioned into a detent releasably engageable with said keeper eye, said rod cooperating with and serving as a hold-down member for said door, said door having an opening, said rod passing through said opening to keep the door in a "down" but ready-to-close position.

In carrying out a preferred embodiment of the invention an extension frame is provided at the entrance and is constructed to serve as an anchor for the hinged or pivoted end of the trip rod, whereby to adapt the free end of the rod to pass through a hole provided therefor in the trap door.

In the accompanying drawings, wherein like numerals are employed to designate like parts throughout the views:

Figure 1 is a perspective view of an animal trap constructed in accordance with the principles of the invention showing the manner in which the same serves, when the trap has been sprung, to safely trap the victim in the cage; and Figure 2 is a view on a smaller scale based on Figure 1 and in section and elevation showing the relationship of the cooperating parts when the trap is set for purposes of making the desired catch.

Referring now to the drawings by way of reference numerals and lead lines, the cage, which may be of any size and material is preferably a wire one and, let us assume, of the size to trap small animals such as mice, rats and the like or, for that matter, birds and so on. In any event, the cage is preferably rectangular and is denoted by the numeral 4 and is of openwork construction and is characterized by a flat bottom 6, flat top 8, opposed side walls 10—10 and a rear end or closing wall 12. The opposite end of the cage is open as at 14 and is adapted to be closed by a wire or equivalent door 16. The door is, of course, of a shape and size to effectively close the entrance when the door is in its closing position as Figure 1. The door is provided with hinging eyes 18 hinged on a cross shaft 20. The door is provided adjacent its upper intermediate portion with a specially performing hole or opening 22 which is marginally reinforced by a suitably inserted and fastened grommet 24. This hole serves to permit passage therethrough of the hold-down or trip rod 26. The free end of the rod is laterally bent to provide a detent 28 which serves in a manner to be later described. The opposite end of the rod is formed with an eye 30 which is hingedly anchored on a mooring eye 32 at the apex of a substantially triangular frame 34. The latter is made of suitable rod members 36—36 appropriately shaped and converging and provided with the eye 32. The opposite ends are appropriately but rigidly connected with the cross shaft 20 and with the base or bottom of the cage. The numeral 38 designates a brace and 40 denotes a coil spring which embraces the cross rod 20 and has one end 42 bearing against the exterior side of the hinged door and the opposite end portion 44 suitably connected with the brace 38. The tension of the spring is obviously such as to urge the door to its upwardly swinging and consequently closed position, the position as shown in Figure 1. The spring may be cocked when the door is swung down to the trapping position, the position seen in Figure 2 at the right. The animal actuated pan or platform is a simple wire member and it is denoted by the numeral 46, the same having appropriate hinging eyes 48 hinged on the transverse adapter rod 50. This pan at its hinged end is provided with a keeper eye 52 which serves obviously to accommodate the releasable detent 28 on the releasable end of the trip rod 26. It will be clear therefore that in practice when the trap is set, the trip rod 26 is positioned over the cooperating inner surface of the door and thus serves to hold the door down so long as the detent 28 is engaged with the keeper 52 and the platform or "pan" 46 is in the set position shown in Figure 2. Assuming then that the trap is set the animal enters through the open doorway and passes into the trap, and upon stepping on the platform the weight tilts the platform on the hinges and depresses the platform and at the same time disengages the keeper eye 52 from the detent, releases the trip rod and allows the door to swing upwardly to its closed position, in an obvious manner.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A trap comprising a cage into which the victim is enticed by bait within the trapping limits of said cage, the latter having an entrance at one end only, a pivoted spring-closed trap door adapted to close said entrance, an animal actuated pan pivotally mounted in said cage and provided at its pivoted end with a fixed laterally disposed keeper eye, said door being provided within its marginal limits with a marginally reinforced opening, said cage being provided at said entrance end with an outwardly projecting horizontally disposed frame, said door when in its set position occupying a position atop said frame, and a trip rod pivoted at one end on said frame and passing through said reinforced opening and overlying the door and extending into said cage, the free end of said trip rod being fashioned into a detent and said detent being releasably engaged with said keeper eye, said trip rod serving as a hold-down member for said door.

2. The structure defined in claim 1 wherein said frame is in a plane with the bottom of said cage, is substantially triangular in plan, and the pivoted end of said trip rod is connected to the vertex portion of said frame.

3. A trap comprising a cage into which the victim is enticed by bait within the trapping limits of said cage, the latter having an entrance opening at one end but otherwise closed, an upwardly and downwardly swingable spring actuated door adapted to swing up and close said entrance opening, the portion of said trap adjacent to said entrance opening being provided with an outstanding substantially triangular frame, the apex portion of said frame having an anchoring eye, a trip rod having an eye hingedly attached to said anchoring eye, said door having an opening and the intermediate portion of said rod passing through said door opening and into said cage, the free end of said rod having a laterally bent detent, a pan pivotally mounted within the confines of the trapping space within said cage, and said pan having a keeper eye with which said detent is releasably engageable.

4. A trap comprising a cage into which the victim is enticed by bait confined within the trapping limits of said cage, said cage having an entrance opening at one vertical end but being otherwise closed, a horizontally disposed rigid frame, said frame being substantially triangular in plan and affixed to the bottom of the cage and co-planar therewith and extending beyond said entrance opening, an upwardly and downwardly swingable spring-closed door adapted to be superimposed upon said frame and assume a horizontally disposed set position, said door having a marginally reinforced opening therein, a trip rod having an eye at one end hingedly attached to an outer end portion of said frame, the intermediate portion of said rod passing through said reinforced opening and into the interior of said cage, the inner end of said rod being free and provided with a detent, and a pan pivotally mounted within the confines of the trapping space of said cage, said pan having a keeper eye and said detent being releasably engaged with said keeper eye, said door having its lower end hingedly mounted on said frame at the junctural connection between said frame and the bottom of the cage.

References Cited in the file of this patent

UNITED STATES PATENTS

| 884,380 | Hadley | Apr. 14, 1908 |

FOREIGN PATENTS

| 2,190 | Great Britain | 1899 |
| 10,145 | Great Britain | 1902 |
| 12,921 | Great Britain | 1890 |